Nov. 9, 1948.   J. L. MARSH   2,453,242
SPREADER APRON DRIVE
Filed Oct. 10, 1946   2 Sheets-Sheet 1
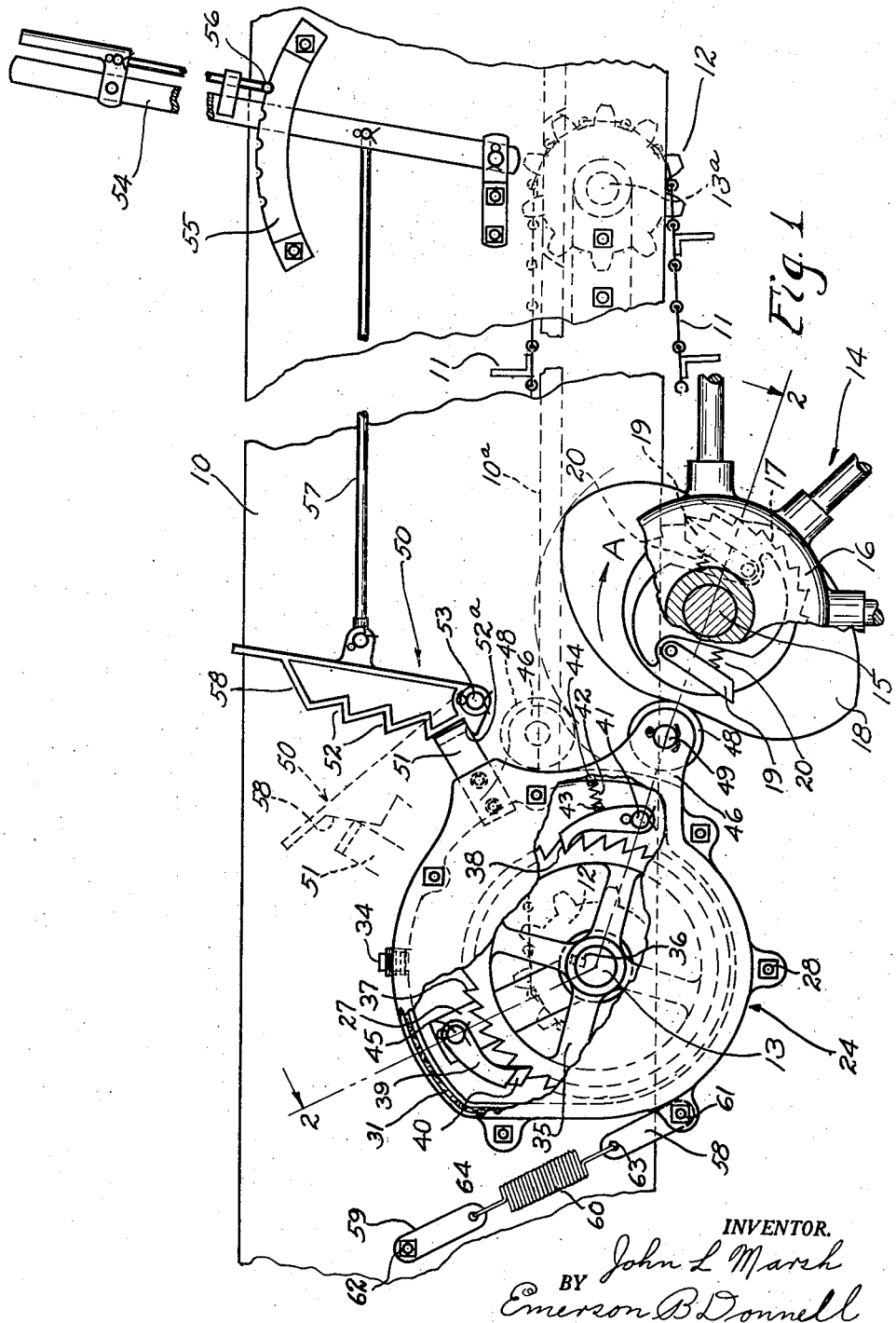
INVENTOR.
John L Marsh
BY Emerson B Donnell
ATTORNEY.

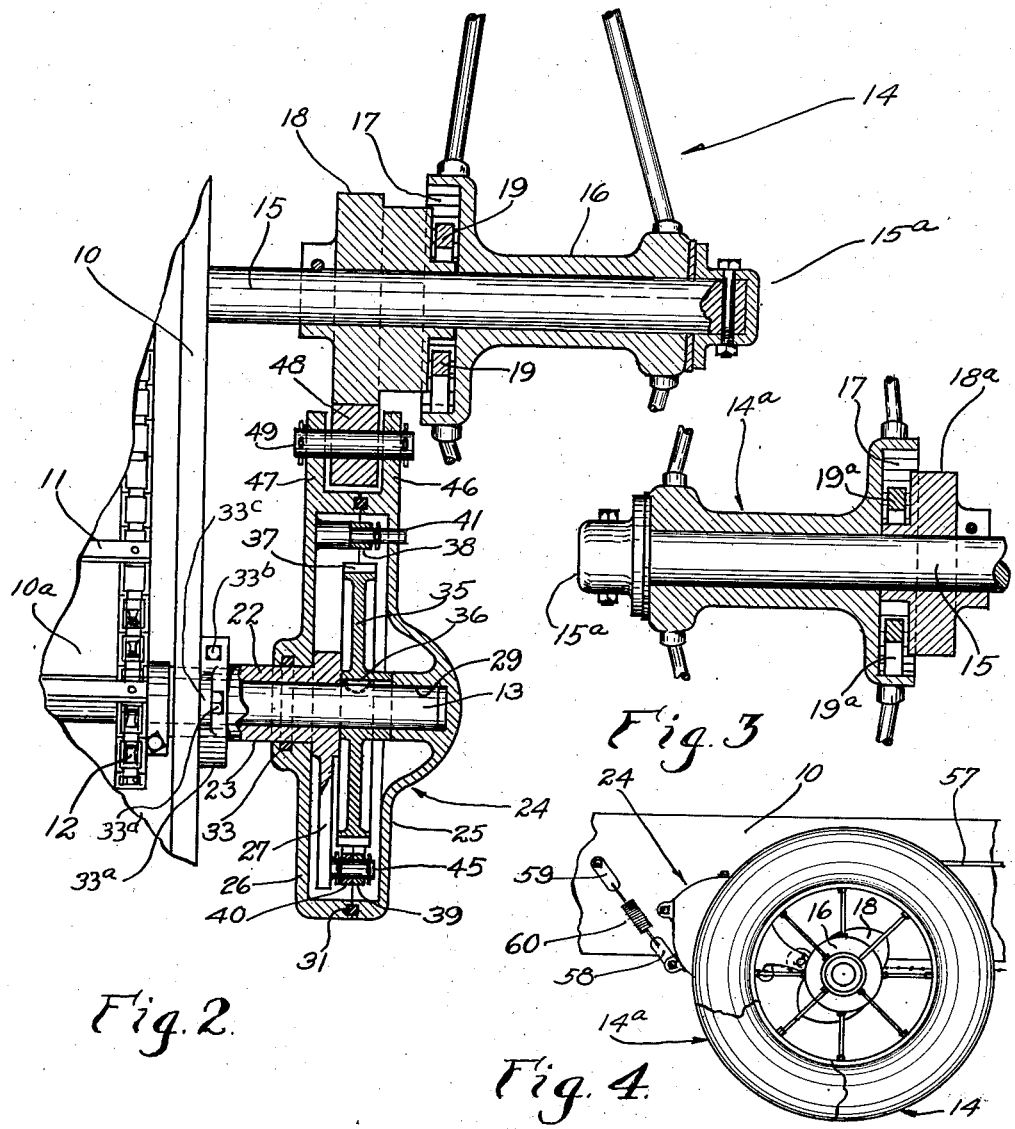

Patented Nov. 9, 1948

2,453,242

UNITED STATES PATENT OFFICE 2,453,242

SPREADER APRON DRIVE

John L. Marsh, Des Moines, Iowa, assignor to J. I. Case Company, Racine, Wis., a corporation of Wisconsin Application October 10, 1946, Serial No. 702,459

9 Claims. (Cl. 74—124)

This invention relates to improvements in intermittent power transmission devices such as those used with fertilizer spreaders and the like, for use where it is desired to move material along the bed of an implement for distribution over the ground in a uniform layer.

The construction of a conventional spreader is understood by those skilled in the art, so only a general description of the device as a whole will be given. It comprises a frame or body mounted upon wheels and in which an apron or conveyor moves toward the rear to feed the material gradually to the distributing mechanism, not shown. The spreader is usually drawn by a tractor or by horses.

The rate of linear travel of the apron can be regulated so as to vary the amount of material spread over a certain area. Beaters not shown are placed at the rear of the body and which break up the material into small particles and pass it to a "wide-spread" or distributor of conventional form which deposits it evenly over the ground.

The conventional spreader is usually so constructed that the vital moving members are exposed to dirt, water and accidental damage. It is an object of this invention to provide a device that has all vital moving parts enclosed, thereby protecting them from dust, trash and accidental damage, and also avoiding danger of injury to the operator.

Another object is to enclose the moving parts so that they can be flooded with oil, thereby prolonging their life.

Another object is to use smaller traction wheels on the spreader so as to allow the use of standard automobile tires. This is advisable only when the mechanism is enclosed and protected from the increased amount of dust encountered near the ground.

Further objects and advantages of the invention will become apparent from a consideration of the following detailed description wherein a satisfactory embodiment of the invention is shown. However, it is to be understood that the invention is not limited to the details disclosed but includes all such variations and modifications as fall within the spirit of the invention.

Figure 1 is a side view of the transmission device with parts removed showing as much of a spreader as necessary to illustrate the invention.

Fig. 2 is a sectional view taken on the line 2—2 of Fig. 1.

Fig. 3 is a fragmentary view of the second supporting wheel.

Fig. 4 is a fragmentary side elevation of the device.

The spreader in this instance comprises a box-like body 10 which contains an apron 11, which apron is carried by sprockets 12 which are secured to shafts 13 and 13a.

Body 10 having a bottom 10a, is supported by wheels 14 and 14a a suitable distance from the ground and which wheels are freely journaled on an axle 15. Axle 15 is freely journaled in bearings affixed to body 10 and which are preferably of conventional type. Hubs 16 of wheels 14 and 14a are provided with internal ratchet teeth 17. A cam 18 is keyed or otherwise secured to the axle 15 and carries pawls 19 pivoted thereto and which engage the ratchet teeth 17 of wheel 14. The ratchet teeth 17 and pawls 19 are so arranged that they will drive cam 18 in one direction only, as shown by the arrow A in Fig. 1, thereby protecting the mechanism from damage when the spreader is transported backwards. Springs 20 urge pawls 19 into positive engagement with ratchet teeth 17.

Wheel 14a, as mentioned above, is provided with ratchet teeth 17 but which are of the opposite hand to those in wheel 14. A pawl support member 18a is fixedly mounted upon axle 15. Member 18a has pawls 19a pivoted thereto, similar to the construction of wheel 14. Wheels 14 and 14a are restrained from axial displacement by a conventional means 15a. This arrangement allows wheels 14 and 14a to turn freely upon axle 15, but which prevents axial displacement of the wheels.

It is evident that this pawl and ratchet arrangement in both wheels will operate the cam 18 at all times including times when the spreader is making a sharp turn. In that case one wheel will drive while the other wheel "pivots" on the ground without rotating on its own axis.

Apron 11 is carried by above mentioned sprockets 12—12, two of which are secured in spaced relation to each other on each of shafts 13 and 13a in a manner well understood and not necessary to further describe. Shaft 13 is journaled in bearings as 22, Fig. 2.

Shaft 13 protrudes from bearing 22 so as to accommodate a rockable ratchet housing 24.

Bearing 22 is fixed relative to body 10 and is provided with an exterior co-axial journal surface 23 which forms a bearing for the ratchet housing 24. An arm 27 is secured to the end of bearing 22 in a position so as not to interfere with the rotation of the housing 24. The function of arm 27 will be explained later.

Ratchet housing 24 is composed of two sections, outer section 25, and inner section 26, which are secured together by bolts 28 or other suitable means of fastening and completely enclose and protect the ratchet mechanism from dust and injury. The housing also allows a pool of oil to be maintained therein for lubrication. The outer section 25 of the housing 24 also has a bearing 29 on the shaft 13, so as to provide an outer support for the housing 24.

The inner section 26 of housing 24 is freely journaled on the outer portion of bearing 22. A felt seal 31 is inserted intermediate the inner and outer sections of housing 24. An annular felt seal 33 is also provided between the bearing 23 and the inner section 26 of housing 24.

Bearing 22 is rigidly secured to body portion 10 as for example by a clamping collar 33a compressed about bearing 22 by a bolt 33b and fastened to body 10 by a flange 33c and bolt 33d.

The felt seals 31 and 33 serves to prevent oil from leaking from the housing and to prevent dust getting in and causing wear.

A quantity of oil is placed in the housing 24 through a filler opening closed by a plug 34 and is carried to the moving parts when the spreader is being operated.

A ratchet wheel 35 is secured to the shaft 13 by a key 36 or other suitable means of fastening and has teeth 37 for engagement with pawls 38, 39 and 40.

Driving pawl 38 engages the teeth 37 of ratchet wheel 35, and functions to rotate the wheel 35 upon rocking of housing 24 about the bearings 23 and 29. Driving pawl 38 is freely pivoted upon a stud 41 and which stud passes through the inner and outer sections 25 and 26 of housing 24, and is prevented from being displaced by cotters or other means of fastening.

A spring 42 urges pawl 38 into positive engagement with the teeth 37 of ratchet wheel 35. Pawl 38 has fixed thereto a pin 43 to locate the spring 42. A similar pin 44 is fixed to the housing to locate the other end of the spring 42.

Stop pawls 39 and 40 are pivoted on a common pin 45 and serve to hold the ratchet wheel 35 against turning in a clockwise direction with respect to Fig. 1. Stop pawls 39 and 40 are of different lengths so that either pawl 39 or 40 will engage a tooth. This arrangement prevents backing up of the ratchet wheel under the reaction of the load to such an extent as would be the case with a single stop pawl, in the event that the feed is, for example, greater than one and one-half teeth, but less than two and thus provides certain of the advantages of a ratchet wheel with fine-pitch teeth while retaining the strength of a wheel having coarse-pitch teeth.

A cotter or other suitable means is used for preventing the pawls 39 and 40 from becoming displaced. Pin 45 is fixed to the arm 27 placed intermediate the ratchet wheel 35 and the inner section 26 of housing 24. The portion of arm 27 adjacent the shaft 13 is fixed as above explained to bearing 22 so that the arm 27 remains stationary when the housing 24 is rotated about bearing 23. Arm 27 also serves to secure housing 24 against axial displacement relative to shaft 13.

Thus it is clear that stop pawls 39 and 40 will be held stationary against rotary displacement and will hold the ratchet wheel 35 from rotating clockwise while the housing 24 returns to the starting position where it is ready to be actuated by the next lobe of cam 18.

Housing 24 has projections 46 and 47 secured thereto, which are part of sections 25 and 26 respectively and form an actuating arm for rocking the housing. A roller 48 is placed intermediate the projections 46 and 47 and turns freely on a pin 49. Pin 49 passes through projections 46 and 47 and is secured against displacement by cotter pins or any other suitable means.

Roller 48 is arranged to co-act with cam 18 and to transmit the rise thereof into a counter-clockwise rotation or rocking of housing 24.

It is desirable to regulate the amount of material spread per unit of travel of the spreader. This is accomplished by limiting the proximity of the roller 48 to the cam 18, thus varying the angular rotation of ratchet housing 24, which results in varying the linear travel of the conveyor 11.

The arrangement used to accomplish this comprises a stop lever or abutment element 50 adjacent the housing 24, and which lever is pivoted to a pin 53. Pin 53 is secured to body 10 by any suitable means. An arm 51 is secured to housing 24 so that it strikes a previously selected step 52 of stop lever 50, thereby limiting the proximity of the roller 48 to the cam 18. The stop lever 50 has the steps 52 positioned at various distances from pin 53, and the angular displacement of housing 24 is controlled by the step selected.

The selection of the proper steps is done from the operator's position by a lever 54, having a ratchet quadrant 55 and detent 56. A link 57 connects the stop lever 50 and lever 54.

The position of roll 48 in its maximum distance from cam 18 places it out of reach of the cam 18 thereby preventing the operation of the spreader mechanism when so desired while the vehicle is being transported over the ground. This position is shown dotted in Fig. 1. This position is obtained when stop lever 50 is adjusted so that arm 51 strikes step 58 thereof. Varied amounts of feed are obtained by selecting the proper setting of lever 54. A final step 52a is provided to prevent the roller 48 from rotating beyond the cam into an inoperative position.

To maintain contact between cam 18 and roller 48, members 58 and 59 and a spring 60 are mounted intermediate the housing 24 and body 10. Member 58 is secured to housing 24 by a bolt 61 and member 59 is secured to body 10 by a bolt 62. Spring 60 is a tension spring and is hooked through holes 63 and 64 of members 58 and 59.

It will be noted that step 58 has a decided slope relatively to arm 51. It is necessary that cam 18 raise arm 51 to predetermined positions before any of stops 52 or 58 can be engaged beneath arm 58. Arm 51 is therefore moved beyond the stop in each case. As will be apparent, this would also be true of stop 58 so that in transport position the cam would still contact roller 48 and lift it slightly, resulting in unnecessary wear and an undesirable clicking noise. Owing to the slope mentioned, movement of lever 54 into transport adjustment will, after cam 18 has lifted lever 51 far enough to initially engage stop 58, force lever 51 to a further raised position and remove roller 48 entirely from the path of cam 18.

The above being a complete description of an illustrative embodiment of the invention, what is claimed as new and desired to be secured by Letters Patent of the United States is:

1. In a ratchet drive for a spreader having a body portion, the combination of a driven shaft, a ratchet wheel on the driven shaft, a bearing for said driven shaft supported in stationary relation to said body portion, an arm adjacent said ratchet wheel and supported in stationary relation on said bearing, a stop pawl journaled on said arm and engaged with said ratchet wheel so as to prevent reverse rotation thereof, a housing enclosing said wheel and arm, and journaled concentrically with said driven shaft, a driving pawl journaled within said housing and engaged with said ratchet wheel for driving it upon rocking of said housing in one direction, and means for rocking said housing in first one direction and then the other.

2. In a ratchet drive for a spreader having a body portion, the combination of a driven shaft, a ratchet wheel on the driven shaft, a bearing for said driven shaft supported in stationary relation to said body portion, an arm adjacent said ratchet wheel and supported in stationary relation to said body portion, a stop pawl journaled on said arm and engaged with said ratchet wheel so as to prevent reverse rotation thereof, a housing enclosing said wheel and arm, and journaled on said bearing concentrically with said driven shaft, a driving pawl journaled within said housing and engaged with said ratchet wheel for driving it upon rocking of said housing in one direction, and means for rocking said housing first in one direction and then in the other.

3. In a ratchet drive for a spreader having a body portion, the combination of a driven shaft, a ratchet wheel on the driven shaft, an arm adjacent said ratchet wheel and supported in stationary relation to said body portion, a stop pawl journaled on said arm and engaged with said ratchet wheel so as to prevent reverse rotation thereof, a housing enclosing said wheel and arm, and journaled concentrically with said driven shaft, a driving pawl journaled within said housing and engaged with said ratchet wheel for driving it upon rocking of said housing in one direction, cam means for rocking said housing in one direction, and means for rocking said housing in the other direction.

4. In a ratchet drive for a spreader having a body portion, the combination of a driven shaft, a ratchet wheel on the driven shaft, an arm adjacent said ratchet wheel and supported in stationary relation to said body portion, a stop pawl journaled on said arm and engaged with said ratchet wheel so as to prevent reverse rotation thereof, a housing enclosing said wheel and arm, and journaled concentrically with said driven shaft, a driving pawl journaled within said housing and engaged with said ratchet wheel for driving it upon rocking of said housing in one direction, means for rocking said housing in one direction, a stop arm on said housing and an abutment member supported adjacent said stop arm and engaged with said stop arm in one position thereof, said abutment being adjustable in position for regulating the amount of rocking of said housing, and means for rocking said housing in the other direction.

5. In a ratchet drive for a spreader having a body portion, the combination of a driven shaft, a ratchet wheel on the driven shaft, an arm adjacent said ratchet wheel and supported in stationary relation to said body portion, a stop pawl journaled on said arm and engaged with said ratchet wheel so as to prevent reverse rotation thereof, a housing enclosing said wheel and arm, and journaled concentrically with said driven shaft, a driving pawl journaled within said housing and engaged with said ratchet wheel for driving it upon rocking of said housing in one direction, means for rocking said housing in one direction, a stop arm on said housing and an abutment member supported adjacent said stop arm and having a plurality of steps shiftable selectively into engagement with said stop arm in one position thereof, means for shifting said abutment and means for rocking said housing in the other direction.

6. In a ratchet drive for a spreader having a body portion, the combination of a driven shaft, a ratchet wheel on the driven shaft, an arm adjacent said ratchet wheel and supported in stationary relation to said body portion, a stop pawl journaled on said arm and engaged with said ratchet wheel so as to prevent reverse rotation thereof, a housing enclosing said wheel and arm, and journaled concentrically with said driven shaft, a driving pawl journaled within said housing and engaged with said ratchet wheel for driving it upon rocking of said housing in one direction, cam means for rocking said housing in one direction and an actuating arm on the housing and engaging the cam means, a stop arm on said housing and an abutment member supported adjacent said stop arm and having a plurality of steps shiftable selectively into engagement with said stop arm in one position thereof, one of said steps being so shaped as to move said stop arm in a direction to shift said actuating arm to a position clear of said cam, means for shifting said abutment and means for rocking said housing in the other direction.

7. In a ratchet drive for a spreader having a body portion, the combination of a driven shaft, a ratchet wheel on the driven shaft, an arm adjacent said ratchet wheel and supported in stationary relation to said body portion, a plurality of stop pawls journaled on said arm and engaged with said ratchet wheel at peripherally spaced points thereon so as to prevent reverse rotation thereof, a housing enclosing said wheel and arm, and journaled substantially concentrically with said driven shaft, a driving pawl journaled within said housing and engaged with said ratchet wheel for driving it upon rocking of said housing in one direction, and means for rocking said housing first in one direction and then in the other.

8. In a ratchet drive for a spreader having a body portion, the combination of a driven shaft, a ratchet wheel on the driven shaft, a stop pawl journaled at a point fixed in relation to said body portion and engaged with said ratchet wheel so as to prevent reverse rotation thereof, a housing enclosing said wheel and pawl, and journaled substantially concentrically with said driven shaft, a driving pawl journaled within said housing and engaged with said ratchet wheel for driving it upon rocking of said housing in one direction, cam means for rocking said housing in one direction and an actuating arm on the housing and engaging the cam means, a stop arm on said housing and an abutment member supported adjacent said stop arm and having a plurality of steps shiftable selectively into engagement with said stop arm in one position thereof, one of said steps being so shaped as to move said stop arm in a direction to shift said actuating arm to a position clear of said cam, means for shifting said abutment and means for rocking said housing in the other direction.

9. In a ratchet drive for a spreader having a body portion, the combination of a driven shaft, a bearing member for said shaft extending laterally from said body portion, a leak-proof housing journaled on said bearing member, a ratchet wheel within said housing and fixed to said shaft, a stop pawl within said housing and engaging said ratchet wheel to prevent reverse rotation of said wheel, a support arm for said stop pawl carried by said bearing member, a driving pawl journaled in said housing and engaging said ratchet wheel for rotating said wheel in one direction, cam means for rocking said housing in one direction, an actuating arm on said housing and engaging said cam means, a stop arm on said housing, an abutment member pivoted to said body portion and having a plurality of steps selectively engageable with said stop arm, one of said steps being so shaped as to force said stop arm into a position so that said actuating arm is out of engagement with said actuating cam, means for shifting said abutment and means urging said housing in operative engagement with said actuating cam.

JOHN L. MARSH.

REFERENCES CITED

The following references are of record in the file of this patent:

UNITED STATES PATENTS

| Number | Name | Date |
|---|---|---|
| 988,091 | Hammersley | Mar. 28, 1911 |
| 1,909,933 | Donley | May 23, 1933 |
| 2,302,879 | Neighbor et al. | Nov. 24, 1947 |